United States Patent Office 3,516,790
Patented June 23, 1970

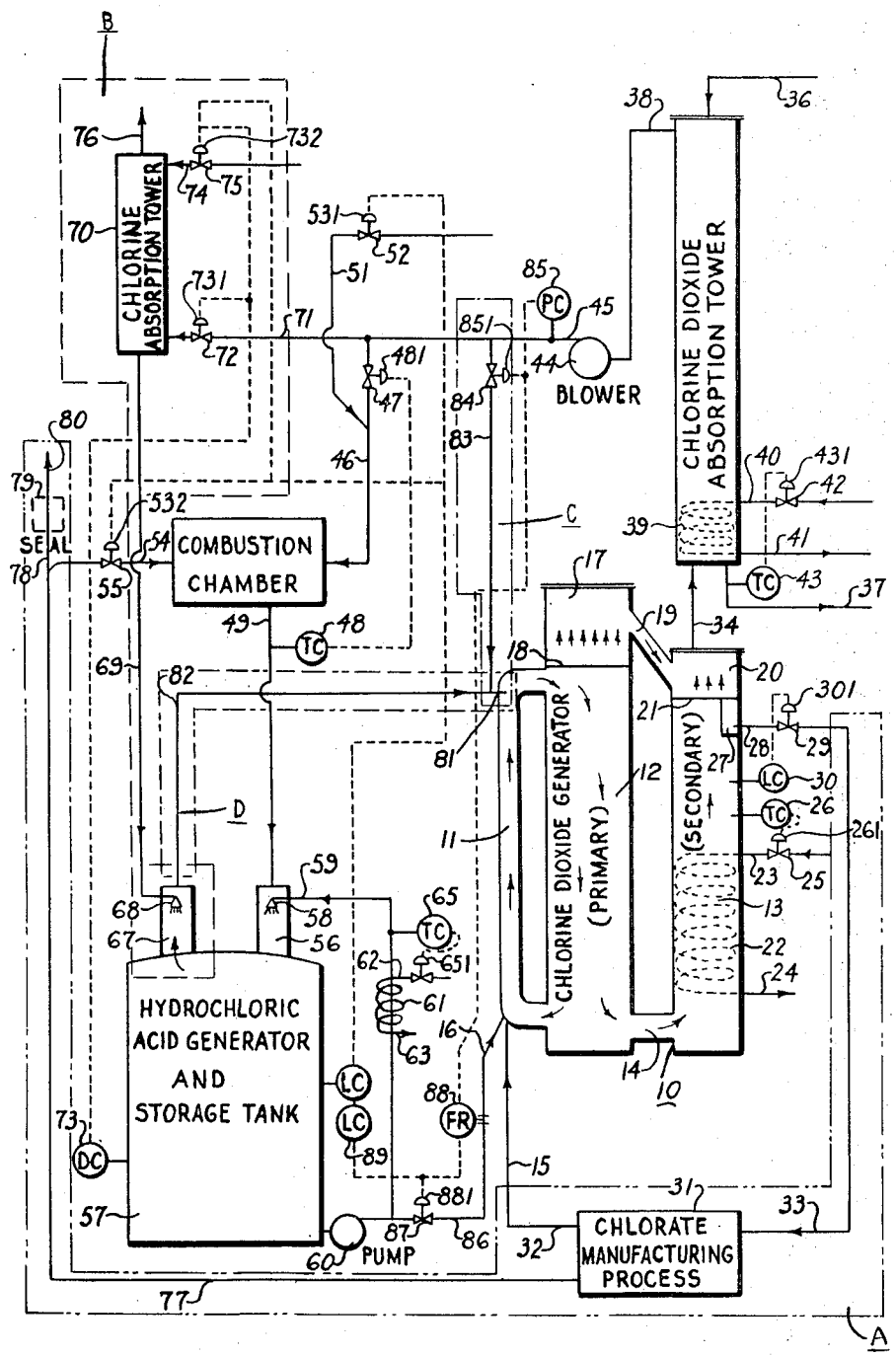

3,516,790
PROCESS AND APPARATUS FOR PREPARING CHLORINE DIOXIDE
Göthe O. Westerlund, Vancouver, British Columbia, Canada, assignor to Chemech Engineering Ltd., Vancouver, British Columbia, Canada
Filed Aug. 9, 1967, Ser. No. 659,547
Claims priority, application Canada, May 20, 1967, 991,056
Int. Cl. C01b 11/02, 11/26; B01j 7/02
U.S. Cl. 23—152
28 Claims

ABSTRACT OF THE DISCLOSURE

This invention provides an improvement in the previously known procedures for preparing chlorine dioxide by the reaction of an aqueous solution of an inorganic chlorate (e.g. sodium chlorate) with hydrogen chloride. The improvement involves two co-ordinated steps. The first step involves using an aqueous solution of hydrochloric acid as the hydrogen chloride. The second step involves sweeping the gaseous reaction products released from the reactant liquor by introducing a diluent gas near the gas-liquid interface of the reactant liquor.

The invention also provides a semi-cyclical procedure for producing the aqueous hydrochloric acid from the by-product chlorine produced while producing the chlorine dioxide.

The invention further provides a semi-cyclical procedure for producing the aqueous inorganic chlorate by electrolysis of an aqueous inorganic chloride, and using the hydrogen gas by-product of that reaction to react with the by-product chlorine produced while producing the chlorine dioxide to prepare the aqueous hydrochloric acid reactant.

The invention further provides a novel combination of component parts which may be used to carry out the processes of this invention.

The invention also provides novel control for the novel combination of component parts.

This invention relates to an improved process for the preparation of chlorine dioxide. It also relates to apparatus for carrying out the process.

Chlorine dioxide has been prepared in the past by treating chlorates with sulfuric acid or with mixtures of sulfuric acid and an organic reducing agent, such as oxalic acid. However, it has been found that such processes are, in general, uneconomical, hazardous and wasteful.

It was also known that hydrochloric acid and chloric acid may be reacted to produce gaseous mixtures of chlorine dioxide and chlorine. In practice these reactions are carried out by treating aqueous mixtures of water-soluble chlorates and chlorides, such as may be obtained, for example, by chlorinating lime or by the electrolysis of salt, with an excess of a strong acid, for example, hydrochloric acid or sulfuric acid. The reaction above referred to may be represented by the following equations:

(1) $2NaClO_3 + 4HCl \rightarrow 2ClO_2 + Cl_2 + 2NaCl + 2H_2O$ (2) $2NaClO_3 + 12HCl \rightarrow 6Cl_2 + 2NaCl + 6H_2O$ Ordinarily, reaction (2) is predominant over reaction (1) and consequently the yield in chlorine dioxide is correspondingly low.

An effort to overcome the difficulties in low yield of chlorine dioxide was suggested in Canadian Pat. No. 461,586, issued Dec. 6, 1949, to George A. Day and Edward F. Fenn. In general, that invention involved reacting solutions of chlorates with hydrochloric acid, the acid being supplied in an amount substantially less than the equivalent stoichiometric ratio $H^+/ClO_3^- = 2$ of reaction (1), thereby decomposing at any one time only a fraction of the available chlorate, so that the decomposition proceeds at a particularly rapid rate. The chlorate content of the partially spent solution is enriched, as by feeding it to an electrolytic chlorate cell, and returning the fortified solution to the reaction chamber to treat it again with a stoichiometrically insufficient amount of acid. The above-described cycle is then repeated so that substantially all the chlorate supplied is eventually efficiently decomposed, producing mixtures of chlorine dioxide and chlorine containing high proportions of chlorine dioxide.

The patentees state that they prefer to use, as starting materials, concentrated solutions rich in chlorate. It is easily possible to prepare electrolytic cell liquors containing over 40% by weight of salts, and mol ratios of sodium chlorate to sodium chloride of the order of 4 to 1. By using such solutions rich in chlorate, the patentees state that they make available for decomposition at any one time large amounts of chlorate without undue waste of space in the reaction chamber. They also teach that they increase the rate of reaction (1) which, of course, proceeds more rapidly with higher concentrations of the reactants.

The patentees also state that they prefer to use hydrochloric acid to react with the chlorate because the chloride ion takes part in the reaction and therefore is spent without appreciably contaminating the partially depleted solution which is returned to the chlorate cell. The patentees also teach that while they may use aqueous hydrochloric acid, they prefer to use gaseous hydrogen chloride. The advantages alleged for the use of gaseous hydrogen chloride are that they avoid the progressive dilution of the recycled chlorate solution, which dilution would decrease the reaction rate, or would necessitate an added operation of evaporation to retain an efficient output per unit of equipment. The patentees also teach that it is convenient to introduce the gaseous hydrogen chloride into the reaction chamber in a current of air which also serves to sweep the chloride dioxide-chlorine mixture from the reaction vessel.

Since chlorine dioxide is extremely explosive at high temperatures, the reactions described hereinabove have generally been carried out at relatively low temperatures. Furthermore, in order to reduce still further the danger of explosion, a non-reactive (inert) gas is conducted into the reaction vessel; the purpose of the gas is to reduce the concentration of chlorine dioxide in the vessel to a non-explosive proportion.

Another proposal to overcome the difficulties inherent in the above referred to reactions was suggested in U.S. Pat. No. 2,664,341, issued Dec. 29, 1953, to Edelbert E. Kesting. The patentee proposes that the chlorate and hydrochloric acid solutions are caused to flow through a series of consecutive reaction vessels staggered in height, one behind the other, arranged either in the form of a cascade or as a column. In the opposite direction, a stream of inert gas is forced or drawn through the reaction vessels. For example, air or nitrogen may be supplied in a stream to the series of reaction vessels, the purpose being to flush out the chlorine dioxide produced in the individual vessels, and to carry it along, at the same time diluting it to non-dangerous concentrations.

The inert gas is caused to flow through the liquid by means of gas inlet pipes extending to the bottom of the vessels. The uppermost vessel is adjusted to the lowest temperature, while the lowermost vessel has the highest temperature. Under these conditions, the current of gas flowing through the apparatus has the lowest concentration of chlorine dioxide in the vessel having the highest temperature, while the chlorine dioxide concentration increases in the vessels having the highest temperature, while the chlorine dioxide concentration increases in the vessels above the lowermost. Thus, the temperature becomes lower with the concentration of chlorine dioxide increasing, i.e. the highest chlorine dioxide concentration is obtained in the uppermost vessel where the temperature is lowest.

In processes where gaseous hydrogen chloride is used or where large amounts of inert gases are used, there is need for a rather large compressor. The need for such compressor involves increased capital and operating costs.

An object of one broad aspect of this invention is the provision of an improved process for preparing chlorine dioxide from an aqueous solution of hydrochloric acid, and in which diluent gases are admitted to the system in a more advantageous manner.

An object of a variant of that aspect of this invention is the provision of an improved process for producing chlorine dioxide in which diluent gases for minimizing explosion hazards are self-produced in the system.

An object of another aspect of this invention is the provision of a process for preparing chlorine dioxide in which the reactants are provided by an electrolytic chlorate cell, and in which diluent gases are admitted to the system in a more advantageous manner.

An object of yet another variant of that aspect of this invention is the provision of an improved process for producing chlorine dioxide in which the off-gases from the electrolytic chlorate cell and in which diluent gases are admitted to the system in a more advantageous manner.

An object of a variant of that aspect of this invention is the provision of an improved process for producing chlorine dioxide in which by-product chlorine is used for the production of the reducing agent.

An object of another aspect of this invention is the provision of an improved process for producing chlorine dioxide by controlling the water balance in the system thereby improving the efficiency of the process.

An object of still another aspect of this invention is the provision of an improved process for producing chlorine dioxide by correlating the temperature of the system with the rate of injection of diluent gas, thereby improving the process.

An object of yet another aspect of this invention is the provision of an improved process for producing chlorine dioxide by controlling the temperature of a chlorine dioxide absorption zone whereby to control the ratio of $Cl_2:ClO_2$.

An object of another aspect of this invention is the provision of an improved apparatus system for producing chlorine dioxide.

An object of yet another aspect of this invention is the provision of an improved chlorine dioxide generator provided with improved process controls in combination with an improved apparatus system for producing chlorine dioxide.

An object of still another aspect of this invention is the provision of an improved chlorine dioxide absorption tower provided with improved process controls in combination with an improved apparatus system for producing chlorine dioxide.

An object of yet another aspect of this invention is the provision of an improved hydrochloric acid generator provided with improved process controls in combination with an improved apparatus system for producing chlorine dioxide.

By an aspect of this invention there is provided, in a process for the preparation of chlorine dioxide by the reaction of an aqueous solution of an inorganic chlorate with hydrogen chloride, in an enclosed reaction zone, the improvement comprising the steps of: (a) reacting the inorganic chlorate with an aqueous solution of hydrochloric acid; and (b) sweeping the gaseous products of reaction comprising chlorine and chlorine dioxide from a gas zone superposing the liquor zone with a diluent gas admitted directly to the liquor zone near the interface between the gas zone and the liquor zone.

By a first embodiment of this aspect of the invention, the aqueous hydrochloric acid is produced by the step of (c) separating chlorine gas from the mixture of chlorine gas and chlorine dioxide produced in step (a); (d) reacting chlorine gas with hydrogen gas to produce hydrogen chloride gas; (e) dissolving hydrogen chloride gas with water to produce hydrochloric acid in a hydrochloric acid production zone; (f) scrubbing undissolved gases in the hydrochloric acid production zone with chlorine-water solution; and (g) using the scrubbed gases comprising chlorine, carbon dioxide, water vapor and hydrogen chloride gas as the diluent gas.

By a second embodiment of this aspect of this invention, the reaction of an aqueous solution of an inorganic chlorate with hydrogen chloride in a reaction zone, involves the steps of: (i) reacting the inorganic chlorate with an aqueous hydrochloric acid solution, whereby to form chlorine dioxide gas and chlorine gas; (ii) separating the chlorine gas from chlorine dioxide; (iii) reacting a portion of the chlorine gas with hydrogen gas to form hydrogen chloride; (iv) dissolving hydrogen chloride in water to form an aqueous solution of hydrochloric acid; and (v) employing the aqueous hydrochloric acid produced in step (iv) as reactant in step (i).

By one embodiment of this aspect of this invention, the amount of water used to dissolve the hydrogen chloride in step (iv) is insufficient to dissolve all the hydrogen chloride, whereby hydrogen chloride gas is also used as reactant in step (i).

By another embodiment of this aspect of this invention, a portion of the water which is used in dissolving the hydrogen chloride is in the form of a chlorine-water solution which results when a portion of the chlorine gas formed in step (i) is absorbed in water, this water also serving to separate the chlorine reactant gas from carbon dioxide by-product.

By another embodiment of this aspect of this invention, a portion of the water which is used in dissolving the hydrogen chloride is in the form of a recycled solution of aqueous hydrochloric acid.

By another embodiment of this aspect of the present invention, the reaction of an aqueous solution of an inorganic chlorate with hydrogen chloride in a reaction zone, involves the steps of: (i) effecting an electrolysis reaction of an aqueous solution of an inorganic chloride whereby to produce an aqueous solution of an inorganic chlorate; (ii) conducting effluent liquor from the electrolysis reaction containing an aqueous solution of an inorganic chlorate and an inorganic chloride to a reaction zone where it is reacted with an aqueous solution of hydrochloric acid whereby to form chlorine gas and chlorine dioxide gas; (iii) recycling the effluent liquor from reaction zone (ii) as recycle feed for the electrolysis reaction; (iv) separating the chlorine gas from the chlorine dioxide gas; (v) reacting a portion of the separated chlorine gas with hydrogen gas whereby to form hydrogen chloride gas; (vi) dissolving the hydrogen chloride gas with water to form an aqueous solution of hydrochloric acid; and (vii) employing the hydrochloric acid produced in step (vi) as reactant in step (ii).

By one embodiment of this aspect of the present invention, the cell off-gases from the electrolysis reaction in step (i) are used as the source of hydrogen gas for the reaction in step (v).

By another embodiment of this aspect of the present invention, the cell off-gases consist of hydrogen, oxygen, chlorine, carbon dioxide and water vapor and are used as a source of both chlorine gas and hydrogen gas for the reaction in step (v) to form hydrogen chloride.

By one embodiment of this aspect of this invention, the diluent gas consists of chlorine, carbon dioxide and water vapor.

By another embodiment of this aspect of this invention, the diluent gas comprises a portion of the essentially chlorine dioxide-free product of the reaction of step (ii).

By yet another embodiment of this aspect of this invention, the diluent gas comprises chlorine, carbon dioxide, water vapor and reactant hydrogen chloride gas.

By yet another embodiment of this aspect of the present invention, the chlorine-water solution used in step (f) is formed by washing a portion of the chlorine gas separated from the mixture of chlorine gas and chlorine dioxide gas in step (c) with water, whereby simultaneously to remove carbon dioxide.

By yet another aspect of the present invention, a system is provided for the preparation of chlorine dioxide, such system including: (i) a chlorine dioxide generator including chlorate solution meet means, hydrochloric acid reactant inlet means, liquor effluent means and reaction gas outlet means; (ii) a chlorine dioxide absorption tower including gas inlet means linked to the reaction gas outlet means of the chlorine dioxide generator, solvent water inlet means, solution effluent means, diluent gas inlet means for admitting diluent gas directly to the liquor near the gas-liquor interface when liquor and gas are present in the generator and gas outlet means; (iii) a combustion chamber including first gas reactant inlet means coupled to the gas outlet means of the chlorine dioxide absorption tower, second reactant gas inlet means, and reaction gas outlet means; and (iv) a hydrochloric acid production and storage tank including a scrubbing and cooling inlet head, gas inlet means to the inlet head linked to the reaction gas outlet means of the combustion chamber, solvent water inlet means to the inlet head, and hydrochloric acid outlet means linked to the hydrochloric acid inlet means of the chlorine dioxide generator; the improvement wherein there is additionally provided: (a) gas inlet means near the gas-liquid interface of the chlorine dioxide generator.

By an embodiment of this aspect of the present invention, the diluent gas inlet means comprises: a gas conducting line between the hydrochloric acid production and storage tank, preferably leading from the secondary scrubbing and cooling head of the hydrochloric acid production and storage tank, to the gas inlet near the gas-liquid interface of the chlorine dioxide generator.

By an embodiment of this aspect of this invention, the hydrochloric acid production and storage tank is also provided with a recycle leg from the bottom of the tank to the solvent water inlet means to the inlet head.

By a variant of this embodiment of this aspect of this invention, the recycle leg is provided with a temperature controlling means.

By another embodiment of this aspect of the present invention, the system for the preparation of chlorine dioxide includes: (i) an electrolytic cell for the preparation of an aqueous solution of an inorganic chlorate from an aqueous solution of an inorganic chloride, the cell being provided with reactant liquor inlet means, effluent liquor outlet means and reaction gases outlet means; and (ii) wherein, in the chlorine dioxide generator the chlorate solution inlet means is linked to the effluent liquor outlet means of the electrolytic cell, and the liquor effluent means is linked to the reactant liquor inlet means of the electrolytic cell, and (iii) wherein, in the combustion chamber, the second reactant gas inlet means is coupled to the reaction gases outlet means of the electrolytic cell.

By an embodiment of this aspect of the present invention, there is additionally provided: (c) a chlorine absorption tower including gas inlet means coupled to the gas outlet means of the chlorine dioxide absorption tower, solvent water inlet means, chlorine-water solution effluent means, and water-insoluble gas venting means; and (d) a secondary scrubbing and cooling head on the hydrochloric acid production and storage tank including liquid inlet means linked to the chlorine-water solution effluent means of the chlorine absorption tower.

By still another embodiment of any of the above described aspects or embodiments of the system of this invention, both a temperature control means and a liquor level control means are provided for the chlorine dioxide generator.

By a still further embodiment of any of the above described aspects or embodiments of the system of this invention, a temperature control is provided at the chlorine dioxide water effluent of the chlorine dioxide absorption tower.

By yet another embodiment of any of the above described aspects or embodiments of the system of this invention, a pressure control is provided in the gas outlet line from the chlorine dioxide absorption tower.

By still a further embodiment of any of the above described aspects or embodiments of the system of this invention, a density control, a level control, and a low liquor control are provided in the hydrochloric acid production and storage tank.

By yet a still further embodiment of the above described aspects or embodiments of the system of this invention, a temperature control is provided in the reaction gas outlet from the combustion chamber.

The accompanying drawing is a schematic flow sheet showing a system according to broad aspects of the present invention, including blocks A, B, C and D which represent singly and in combination various embodiments and aspects of this invention.

Referring to the drawing, reference numeral 10 designates generally a chlorine dioxide generator. This may be a conventional enclosed reaction vessel but preferably is the chlorine dioxide generator disclosed and claimed in U.S. application Ser. No. 584,736 filed Oct. 6, 1966. It includes an enclosed primary chamber 11, a recirculating leg 12 and an enclosed secondary chamber 13 connected thereto by liquor connecting leg 14. The lower portion of the recirculating leg 12 is provided with a chlorate inlet line 15 and a hydrochloric acid inlet line 16. Reaction gases accumulate at the upper reaches 17 of the enclosed primary chamber 13 to provide a gas-liquid interface 18. The gas in the upper gas zone 17 is swept to the secondary chamber 13 through gas chute 19, and provides a secondary gas zone 20 having a gas-liquor interface 21.

The enclosed secondary chamber 13 is provided with a heat exchanger 22 disposed in the lower portion thereof. The heat exchanger 22 incldues steam inlet line 23 and condensate outlet line 24. Steam inlet line 23 is provided with a valve 25 controlled by a servo 261 operated by a temperature control 26 provided with conventional temperature responsive means disposed in secondary chamber 13.

Reaction liquor discharges from secondary chamber 13 by passing over overflow weir 27 to effluent line 28. Effluent line 28 is provided with a valve 29 controlled by a servo 301 operated by a level sensing control 30 provided with conventional level sensing means disposed in secondary chamber 13.

One preferred aspect of this invention involves using an electrolytic chlorate cell generally indicated by reference numeral 31 as the source of chlorate. The essential components of this aspect of this invention are bounded by the broken lines of the block A. While any electrolytic cell may be used, it is preferred to use the cell covered by Canadian Pat. No. 741,778. The cell 31 includes a reaction liquor effluent line 32 linked to the chlorate inlet line 15 and a reactant liquor inlet line 33 linked to the effluent line 28. The cell also includes a cell gas outlet line 77, whose interconnections will be described in detail hereinafter.

The chlorine dioxide generator 10 is provided with a reaction gas outlet line 34, which leads to a chlorine dioxide absorption tower 35. The chlorine dioxide reaction gas is composed of chlorine, chlorine dioxide, carbon dioxide and water vapor, which may be in approximately the following ranges of proportions: 3–92% $Cl_2$; 5–15% $ClO_2$; 0–60% $CO_2$ and 3–50% $H_2O$. The chlorine dioxide absorption tower 35 includes an upper dissolving water inlet line 36, a lower aqueous chlorine dioxide solution effluent line 37 and an upper gas outlet line 38. The gas emerging from the chlorine dioxide absorption tower is composed of chlorine, carbon dioxide and water vapor, which may be in approximately the following ranges of proportions: 3–98% $Cl_2$; 0–60% $CO_2$; and 1–6% $H_2O$.

The chlorine dioxide absorption tower 35 is provided, at its lower end, with a cooling coil 39 provided with a cooling water inlet line 40 and a cooling water outlet line 41. The amount of cooling water passing through cooling coil 39 is regulated by a valve 42 operated by a servo 431 controlled by a temperature control 43, provided with conventional temperature sensing means within aqueous chlorine dioxide solution effluent line 37.

Disposed in chlorine dioxide absorption tower gas outlet line 38 is a blower 44 which propels the gas through a main gas line 45. Connected to the main gas line 45 is a chlorine gas stream inlet line 46 leading to a combustion chamber 50. Chlorine gas stream inlet line 46 is provided with a valve 47 operated by a servo 481 controlled by a temperature control 48, provided with conventional temperature sensing means within product gas outlet line 49 of combustion chamber 50.

For the purpose of start-up and for periods of time when the amount of chlorine gas is low, a chlorine make-up line 51 is provided which connects to chlorine gas stream inlet line 46. The amount of chlorine fed through make-up line 51 is controlled by valve 52 which is operated by a servo 531 whose operation is controlled by a level control 53 to be described in further detail hereinafter.

The combustion chamber 50 is also provided with hydrogen gas inlet line 54, the amount of hydrogen admitted being controlled by valve 55, operated by servo 532, controlled by the level controller 53 to be described in greater detail hereinafter.

The effluent from the combustion chamber 50 is led via a product gas outlet line 49 to the primary scrubber and cooler 56 of a hydrochloric acid generator and storage tank 57. The composition of the gas in line 49 is hydrogen chloride vapor, chlorine gas, carbon dioxide and water vapor, usually in the following ranges of proportions: 30–95% HCl; 1–60% $Cl_2$; 0–60 $CO_2$; and 2–12% $H_2O$. In the primary scrubber and cooler 56 the gas is washed with a temperature-controlled aqueous hydrochloric acid solution emerging through nozzles 58 from recycle line 59. The aqueous hydrochloric acid solution is pumped by pump 60 from near the bottom of the hydrochloric acid generator and storage tank 57 via line 59 past a temperature-controlling cooling coil 61. Cooling coil 61 is provided with cooling water inlet line 62 and water outlet line 63. The amount of water fed through cooling water inlet line 62 is controlled by valve 64 which is operated by a servo 651 controlled by a temperature control 65 provided with conventional temperature sensing means within the recycle line 59.

In another embodiment of this invention shown bounded by the broken lines in block D, the residual or tail gases passing upwardly from within the hydrochloric acid production and storage tank 57 are led to a secondary scrubber and cooler 67. In the secondary scrubber and cooler 67, such gases are washed by a chlorine-water solution emerging through nozzle 68 fed by chlorine-water solution line 69.

The chlorine-water solution is provided by a chlorine absorption tower system which is another embodiment of this invention and shown bounded by the broken lines of block B. Chlorine absorption tower 70 is fed with chlorine-containing gas, namely a gas consisting of chlorine, carbon dioxide and water vapor, via secondary chlorine gas stream line 71 which is attached to main gas line 45.

The secondary chlorine gas stream line 71 is provided with a valve 72 used to control the flow of chlorine. The flow of chlorine is controlled by the valve 72 which is operated by a servo 731 controlled by density control 73 provided with conventional density sensing devices within the lower portion of the hydrochloric acid generator and storage tank 57. Wash water to the chlorine absorption tower 70 is provided through water inlet line 74. The amount of water admitted through water inlet line 74 is controlled by valve 75 which is operated by servo 732, controlled both by density control 73, by temperature control 48 and by level control 53. The water-insoluble carbon dioxide is vented through a discharge vent 76.

In another preferred embodiment of this invention, the hydrogen used as reactant in combustion chamber 50 is provided by the cell gases resulting from the electrolytic production of chlorate in a chlorate cell. Particularly preferred for use is the chlorate cell disclosed in Canadian Pat. No. 741,778. The cell gases which consist of hydrogen, oxygen, water vapor, carbon dioxide and chlorine, (which may be in the following approximate ranges of composition: 86–93% $H_2$; 3–4% $O_2$; 3–6% $H_2O$; 0.5–2% $CO_2$; and 0.5–2% $Cl_2$) are led by cell gas line 77 to valve 55 where it is admitted to combustion chamber 50. A by-pass line 78 is also provided for cell gas line 77. This by-pass line 78 discharges a controlled excess of gases through a seal 79 to be vented by outlet vent 80.

In accordance with yet another preferred embodiment of the present invention shown in the drawing as being bounded by the broken lines of block D, diluent and reactant gas is introduced into the chlorine dioxide generator at a location close to the liquid-gas interface 18. The gas may be admitted through gas inlet line 81. Gas inlet line 81 is fed by primary diluent and reactant gas line 82 which feeds the residual or "tail" from the hydrochloric acid production and storage tank 57 through primary diluent and reactant gas line 82 to gas inlet line 81. The composition of the primary diluent and reactant gas is chlorine, hydrogen chloride, carbon dioxide and, water vapor, usually in approximately the following range of composition: up to 97% $Cl_2$; up to 10% HCl; 0–60% $CO_2$; and 2–8% $H_2O$. Hydrogen chloride being a reactant gas in the diluent gas, greater efficiency of the process results. In addition, gas inlet line 81 may also be fed by secondary gas line 83 which brings such gas from main gas line 45. This represents yet another aspect of this invention and is shown in the drawing as bounded by the broken lines in block C. The flow of gas through secondary diluent gas line 83 is controlled by valve 84 which is operated by servo 851 which is controlled by a pressure control 85 provided with conventional pressure sensing means in main gas line 45.

Aqueous hydrochloric acid solution is pumped from the hydrochloric acid generator and storage tank 57 by means of pump 60 through line 86 which communicates with hydrochloric acid inlet line 16. The flow of the hydrochloric acid through line 86 is controlled by valve 87 which is operated by servo 881. Servo 881 is controlled by a flow rator 88, as well as by a low liquid level gauge 89. The flow rator is provided with conventional flow sensing means in hydrochloric acid line 86, and the low liquid level gauge 89 is provided with conventional liquid level sensing means in hydrochloric acid generator and storage tank 57.

The following additional points should be noted with respect to the various controls of the process. The temperature controller 48 is interlocked with the recirculation of gases from the chlorine dioxide tower. The density of the hydrochloric acid produced in the hydrochloric acid generator and storage tank is regulated by the addition of chlorine-water solution which is controlled by a density control 73 which, in turn, controls the amount of water admitted to the chlorine absorption tower 70. It is to be noted, however, that a minimum flow is required of the water which minimum flow will be in proportion to the production of hydrochloric acid and to the gas flow. It is also to be observed that the make-up of chlorine gas admitted in line 51 is controlled by the liquor control 53 provided with suitable sensing means within hydrochloric acid generator and storage tank 57.

The low level control gauge 89 is for the purpose of ensuring that the tank 57 is not pumped empty when the hydrochloric acid is used as one of the reactants.

The secondary chamber 13 of the chlorine dioxide generator 10 is provided both with a temperature control 26 and a level control 30. The temperature is normally above 50° C. but below the boiling point of the liquor, namely between 105 and 109° C. By means of the level control 30 and the temperature control 26 the water balance in the system is controlled. At a higher temperature the vapor pressure of water increases, resulting in water evaporation from the generator liquor. Temperatures may thus be raised as high as the boiling point of the liquor, and this elevated temperature will drive the reaction in the generator still further.

The temperature control 43 is for the purpose of controlling the ratio of chlorine gas to chlorine dioxide gas which is dissolved in the water. At lower temperatures the ratio of chlorine gas to chlorine dioxide gas increases.

The temperature control in the combustion chamber by-pass provides for higher temperatures in the combustion chamber, as well as providing means for removing water from the generator liquor. A higher rate of diluent gas generally tends to increase the removal of water from the generator liquor.

In general terms, the procedure of aspects of this invention may be summarized as follows:

The chlorate process cell gases are used as feed for the combustion chamber, and the amount of gases so fed are controlled by a temperature controller which is also interlocked with the recirculation of gases from the chlorine dioxide absorption tower. While chlorate cell gases are a preferred source of hydrogen, the hydrogen may come from other sources, e.g. pure hydrogen or from a chlorine-alkali cell. The products of the combustion chamber are scrubbed and cooled before entering the hydrochloric acid generator and storage tank. Thus, condensed water saturated with hydrochloric acid is discharged into the tank. Uncondensed or undissolved gases will pass upwardly through a second scrubber which uses water as a scrubbing agent. The density of the hydrochloric acid is regulated by the chlorine-water addition, but it is noted that a minimum flow of water is required, which flow is proportional to the production of HCl and the gas flow. The gases will further decrease in temperature, more hydrochloric acid will go into solution, and some chlorine will be stripped from the chlorine-water and will pass out with other insoluble gases to the generator. The gaseous HCl in such gas stream will also react with the chlorate and consequently will be fully utilized. The make-up of chlorine is controlled by the liquor level in the hydrochloric acid generator and storage tank.

The aqueous hydrochloric acid solution is pumped into the bottom of the generator, flow being controlled by a flow rator. This feed is interlocked with a low level control on the tank to ensure that the tank is not pumped empty.

Also fed to the generator is a chlorate solution which is fed to the chlorate process as a weaker chlorate solution after it is reacted in the generator. A temperature control and a liquid level control are used in the generator. Gases leave the generator and are transferred to the absorption tower.

Water is added to the tower to maintain the desired concentration of chlorine dioxide in the chlorine dioxide solution. Gases leaving the tower are mainly chlorine, carbon dioxide (whose proportion is dependent on the amount in the cell gases and the bleed from the system) and some water vapor.

A blower provided with a pressure controller regulates pressure throughout the system.

The process system requires a make-up of chlorine which is regulated by the requirement of reducing agent which is, in turn, controlled by a level controlled 53 provided in the hydrochloric acid generator and storage tank 57.

The amount of make-up chlorine is theoretically calculated by the following overall summarized reaction for the aspect of the invention including the electrolytic production of chlorates:

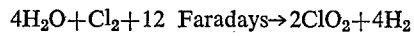

$$4H_2O + Cl_2 + 12\ Faradays \rightarrow 2ClO_2 + 4H_2$$

The system yields up to 95% efficiency. It is thus noted that the only by-products are a small amount of cell gases and some carbon dioxide. The process yields as the main product an aqeuous chlorine dioxide solution.

By following aspects of the present invention, the following procedure and system is provided, namely:

A self-contained system which only requires chlorine, water and electric power after the initial charge-up of brine make-up.

A process is provided which produces chlorine and chlorine dioxide in which the chlorine is internally recirculated in the system for the make-up of reducing agent.

A process is provided which uses chlorine and water vapor (and carbon dioxide if an electrolytic cell is used to produce the hydrogen) as a diluent for the generator gases to minimize explosion hazards.

A closed system process is provided which employs chlorine as a make-up for the production of the reducing agent used in converting sodium chlorate to chlorine dioxide and chlorine.

A closed system is provided which uses hydrogen in the cell gases from the electrolytic process for producing chlorates for combustion in a chlorine atmosphere. Since the system also burns oxygen, the system also provides for the removal of carbon dioxide which otherwise would accumulate.

A closed system is provided which uses chlorine also present in the cell gases from the electrolytic process for producing chlorates as part of the chlorine used to produce the reducing agent.

A process and system is provided which vents the hydrochloric acid generator and storage tank to the generator, and consequently which utilizes hydrogen chloride gas for reduction of the chlorates to chlorine dioxide and chlorine, thereby realizing further economic benefits.

A process and system is provided which feeds the diluent gases to the generator near the interface of the liquor and gas, thus minimizing the pressure drop through the generator, thereby making possible the use of less costly blowers instead of the conventionally used compressors for such diluent gases.

The invention also provides storage facilities for HCl reducing agent in the form of an aqueous solution. Consquently, the system may be operated even when the chlorate process and/or the combustion chamber are shut down. It is also possible to facilitate adequate storage for chlorate liquor, thereby making it unnecessary to maintain excessive chlorine dioxide solution storage.

I claim:

1. In a process for the preparation of chlorine dioxide by the reaction of an aqueous solution of an inorganic chlorate with hydrogen chloride, in an enclosed reaction zone, the improvement comprising the steps of:
    (a) reacting the inorganic chlorate with an aqueous solution of hydrochloric acid;
    (b) sweeping the gaseous products of reaction comprising chlorine and chlorine dioxide from a gas zone superimposing the liquor zone with a diluent gas admitted directly to the liquor zone below the surface of the liquor near the interface between the gas zone and the liquor zone.

2. The process of claim 1 wherein the diluent gas consists of chlorine, carbon dioxide and water vapor.

3. The process of claim 2 wherein the diluent gas has the composition:
3—98% $Cl_2$;
up to about 60% $CO_2$; and
1–6% $H_2O$.

4. The process of claim 1 wherein the diluent gas comprises a portion of the essentially chlorine dioxide free product of the reaction of step (a).

5. The process of claim 1 wherein the diluent gas comprises chlorine, carbon dioxide, water vapor and reactant hydrogen chlorine gas.

6. The process of claim 5 wherein the diluent gas has the composition:
up to 97% $Cl_2$;
up to 10% $HCl$;
up to 60% $CO_2$; and
2–8% $H_2O$.

7. The process of claim 1 wherein the aqueous hydrochloric acid is produced by steps of:
(c) separating chlorine gas from the mixture of chlorine gas and chlorine dioxide produced in step (a);
(b) reacting chlorine gas with hydrogen gas to produce hydrogen chloride gas;
(e) dissolving hydrogen chlorine gas with water to produce hydrochlorine acid in a hydrochloric acid production zone;
(f) scrubbing undissolved gases in the hydrochloric acid production zone with chlorine-water solution; and
(g) using the scrubbed gases comprising chlorine, carbon dioxide, water vapor and hydrogen chloride gas the diluent gas.

8. The process of claim 7 wherein the chlorine-water solution used in step (f) is formed by washing a portion of the chlorine gas separated from the mixture of chlorine gas and chlorine dioxide gas in step (c) with water, whereby simultaneously to remove carbon dioxide.

9. The process of claim 1 wherein the reaction between the inorganic chlorate in aqueous solution and the hydrogen chloride in the enclosed reaction zone involves the steps of:
(i) reacting the inorganic chlorate with an aqueous hydrochloric acid solution, whereby to form chlorine dioxide gas and chlorine gas;
(ii) separating chlorine gas from chlorine dioxide;
(iii) reacting a portion of the chlorine gas with hydrogen gas to form hydrogen chloride;
(iv) dissolving hydrogen chloride in water to form an aqueous solution of hydrochloric acid; and
(v) employing the aqueous hydrochloric acid produced step (iv) as reactant in step (i).

10. The process of claim 1 wherein the reaction between the aqueous solution of the inorganic chlorate with the hydrogen chloride in the enclosed reaction zone involves the steps of:
(i) effecting an electrolysis reaction of an aqueous solution of an inorganic chloride whereby to produce an aqueous solution of an inorganic chlorate hydrogen by-product gas and some by-product carbon dioxide gas;
(ii) conducting effluent liquor from the electrolysis reaction containing an aqueous solution of an inorganic chlorate and an inorganic chloride to a reaction zone where it is reacted with an aqueous solution of hydrochloric acid whereby to form chlorine gas and chlorine dioxide gas;
(iii) recycling the effluent liquor from reaction zone (ii) as recycle feed for the electrolysis reaction;
(iv) separating the chlorine gas from the chlorine dioxide gas;
(v) reacting a portion of the separated chlorine gas with hydrogen gas whereby to form hydrogen chloride gas;
(vi) dissolving the hydrogen chloride gas with water to form an aqueous solution of hydrochloric acid; and
(vii) employing the hydrochloric acid produced in step (vi) as reactant in step (ii).

11. The process of claim 10 wherein the amount of water used to dissolve the hydrogen chloride is insufficient to dissolve all the hydrogen chloride, whereby hydrogen chloride gas is also used as reactant.

12. The process of claim 10 wherein the water which is used in dissolving the hydrogen chloride is in the form of a chlorine-water solution which results when a portion of the chlorine gas is absorbed in water, this water also serving to separate the chlorine reactant gas from carbon dioxide by-product.

13. The process of claim 10 wherein a portion of the water which is used in dissolving the hydrogen chloride is in the form of a recycled solution of aqueous hydrochloric acid.

14. The process of claim 10 wherein the cell off-gases from the electrolysis reaction are used as a source of hydrogen gas for the reaction with chlorine gas.

15. The process of claim 10 wherein the cell off-gases consist of hydrogen, oxygen, chlorine, carbon dioxide, and water vapor and are used as a source of both chlorine gas and hydrogen gas for the reaction to form hydrogen chloride.

16. The process of claim 10 wherein the diluent gas is formed by the step of scrubbing undissolved gases in the hydrochloric acid production zone with a chlorine-water solution.

17. The process of claim 10 wherein the diluent gas is formed by the step of scrubbing undissolved gases in the hydrochloric acid production zone with a chlorine-water solution and wherein the chlorine-water solution is formed by washing a portion of the chlorine gas separated from the mixture of chlorine gas and chlorine dioxide gas with water, whereby simultaneously to remove carbon dioxide.

18. A system for the preparation of chlorine dioxide, including:
(i) a chlorine dioxide generator including chlorate solution inlet means, hydrochloric acid reactant inlet means, liquor effluent means, diluent gas inlet means for admitting diluent gas directly to the liquor near the gas-liquor interface when liquor and gas are present in the generator and reaction gas outlet means;
(ii) a chlorine dioxide absorption tower including gas inlet means linked to the reaction gas outlet means of the chlorine dioxide generator, solvent water inlet means, solution effluent means and gas outlet means;
(iii) a combustion chamber including first gas reactant inlet means coupled to the gas outlet means of the chlorine dioxide absorption tower, second reactant gas inlet means, and reaction gas outlet means; and
(iv) a hydrochloric acid production and storage tank including a scrubbing and cooling inlet head, gas inlet means to the inlet head linked to the reaction gas outlet means of the combustion chamber, solvent water inlet means to the inlet head, and hydrochloric acid outlet means linked to the hydrochloric acid inlet means of the chlorine dioxide generator.

19. The system of claim 18 wherein said diluent gas inlet means comprises:
a gas conducting line between the hydrochloric acid production and storage tank, leading from the secondary scrubbing and cooling head of the hydrochloric acid production and storage tank, to the gas inlet near the gas-liquid interface of the chlorine dioxide generator.

20. The system of claim 18 including:
(i) an electrolytic cell for the preparation of an aqueous solution of an inorganic chlorate from an aqueous solution of an inorganic chloride, the cell being provided with reactant liquor inlet means, effluent liquor outlet means and reaction gas outlet means;
and wherein:
  (ii) in said chlorine dioxide generator, said chlorate solution inlet means is linked to the effluent liquor outlet means of the electrolytic cell, and said liquor effluent means is linked to the reactant liquor means of the electrolytic cell; and
  (iii) in said combustion chamber, said second reactant gas inlet means is coupled to the reaction gas outlet means of the electrolytic cell.

21. The system of claim 20 wherein the hydrochloric acid production and storage tank is also provided with a recycle leg from the bottom of the tank to the solvent water inlet means to the inlet head.

22. The system of claim 21 wherein the recycle leg is provided with a temperature controlling means.

23. The system of claim 20 wherein there is additionally provided:
  (c) a chlorine absorption tower including gas inlet means coupled to the gas outlet means of the chlorine dioxide absorption tower, solvent water inlet means, chlorine-water solution effluent means, and water-insoluble gas venting means; and
  (d) a secondary scrubbing and cooling head on the hydrochloric acid production and storage tank including liquid inlet means linked to the chlorine-water solution effluent means of the chlorine absorption tower.

24. The system of claim 18 wherein both a temperature control means and a liquor level control means are provided for the chlorine dioxide generator.

25. The system of claim 18 wherein a temperature control is provided at the chlorine dioxide water effluent of the chlorine dioxide absorption tower.

26. The system of claim 18 wherein a pressure control is provided in the gas outlet line from the chlorine dioxide absorption tower.

27. The system of claim 18 wherein a density control, a level control, and a low liquor control are provided in the hydrochloric acid production and storage tank.

28. The system of claim 18 wherein a temperature control is provided in the reaction gas outlet from the combustion chamber.

References Cited
UNITED STATES PATENTS

| | | | |
|---|---|---|---|
| 2,317,443 | 4/1943 | Cunningham | 23—152 |
| 2,484,402 | 10/1949 | Day et al. | 23—152 |
| 2,654,656 | 10/1953 | Evans | 23—152 X |
| 2,765,215 | 10/1956 | Pechukas et al. | 23—152 |
| 2,929,682 | 3/1960 | Clark | 23—152 |
| 3,085,860 | 4/1963 | Jacobowsky et al. | 23—156 X |
| 3,180,811 | 4/1965 | Schwanbom et al. | 204—95 |
| 3,242,647 | 3/1966 | Alkemode et al. | 23—154 X |
| 3,322,497 | 5/1967 | Martin | 23—152 |
| 3,387,430 | 6/1968 | Sarvadi | 23—154 X |

ALLEN B. CURTIS, Primary Examiner

U.S. Cl. X.R.

23—282; 204—95